Jan. 22, 1935.     O. D. BOARDMAN     1,988,889
VEHICLE ACTUATED GATE
Filed May 7, 1934     3 Sheets-Sheet 1
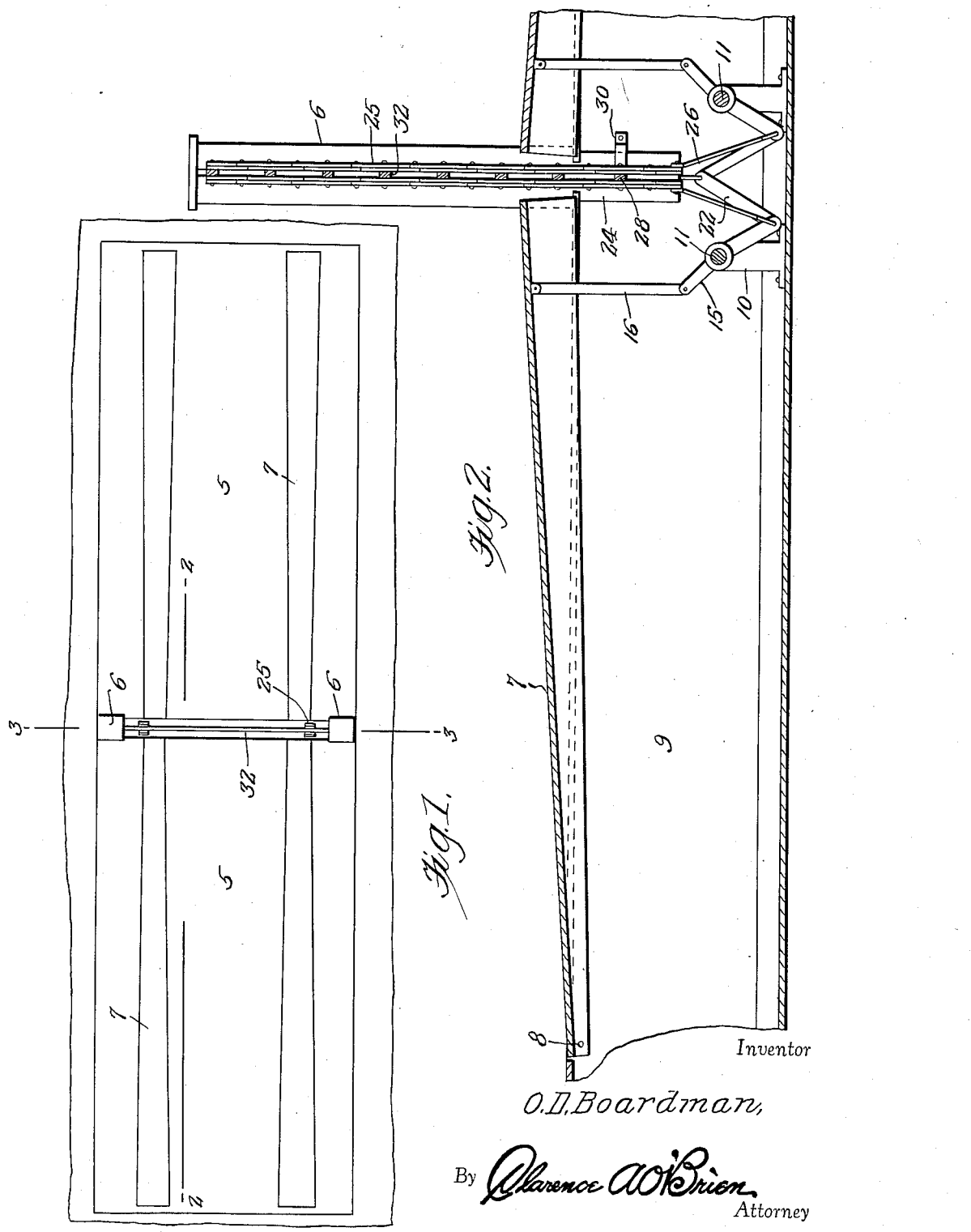
Inventor
O. D. Boardman,
By Clarence A. O'Brien
Attorney Jan. 22, 1935.   O. D. BOARDMAN   1,988,889
VEHICLE ACTUATED GATE
Filed May 7, 1934   3 Sheets-Sheet 3

Inventor
O. D. Boardman,

By *Clarence A. O'Brien*
Attorney

Patented Jan. 22, 1935

1,988,889

UNITED STATES PATENT OFFICE 1,988,889

VEHICLE ACTUATED GATE

Odessa D. Boardman, Chester, Tex.

Application May 7, 1934, Serial No. 724,435

2 Claims. (Cl. 39—49)

The present invention relates to a gate construction which is actuated by the vehicle such as an automobile approaching the gate and the object of the invention resides in the provision of means whereby when an automobile is approaching the gate the weight of the automobile will be sufficient to actuate certain mechanism to cause the gate to be opened and maintain the gate in open position while the automobile passes through the gateway and then the gate will return to a closed position.

Another important object of the invention relates to the provision of a gate construction of this nature which is simple in its construction of parts, compact and convenient in its arrangement of parts, thoroughly efficient and reliable in operation, not likely to easily become out of order and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a top plan view of a gate construction embodying the features of my invention.

Figure 2 is a fragmentary longitudinal section taken substantially on the line 2—2 of Figure 1.

Figure 3:
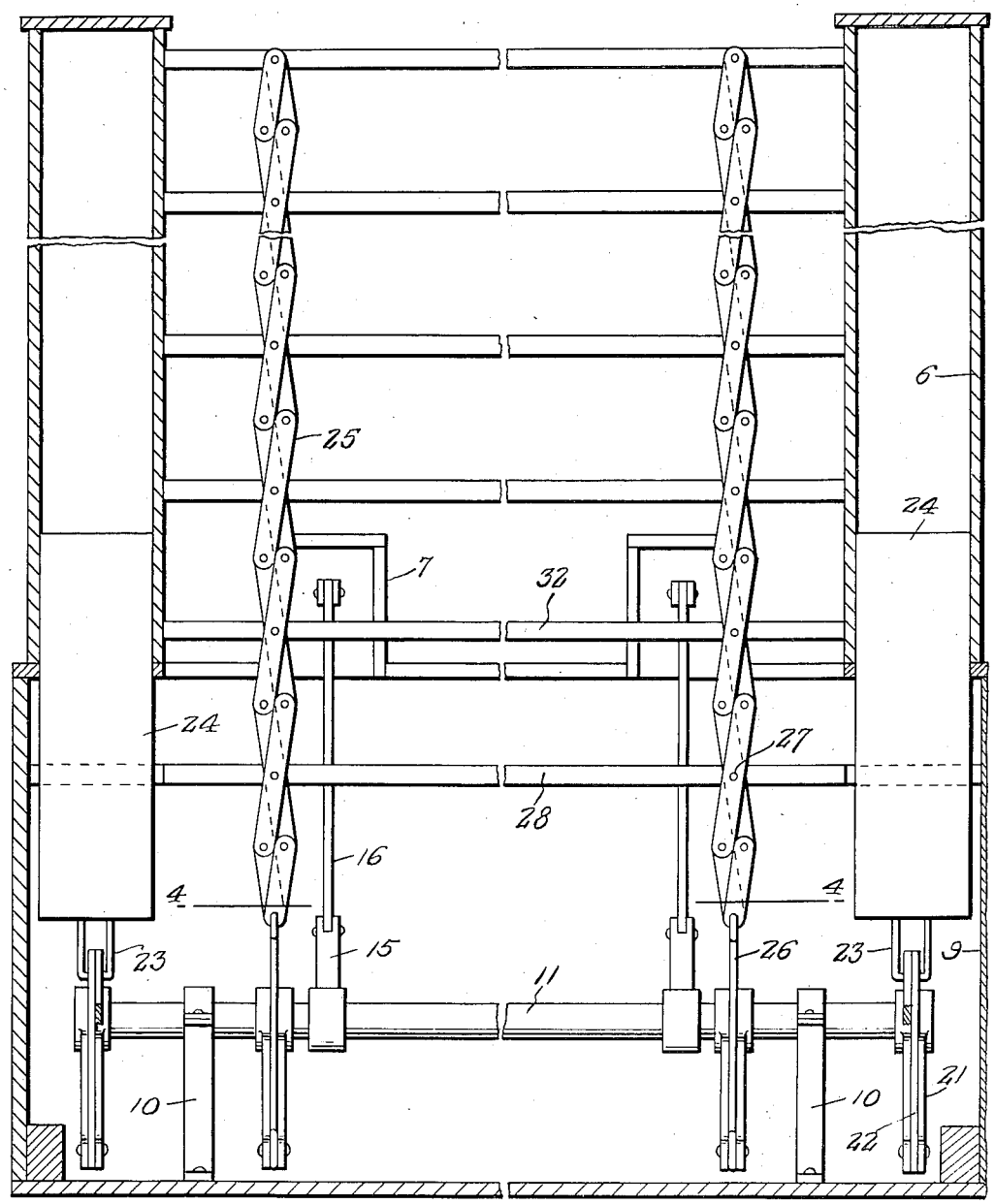
Figure 3 is a vertical transverse section taken substantially on the line 3—3 of Figure 1.
Figure 4:
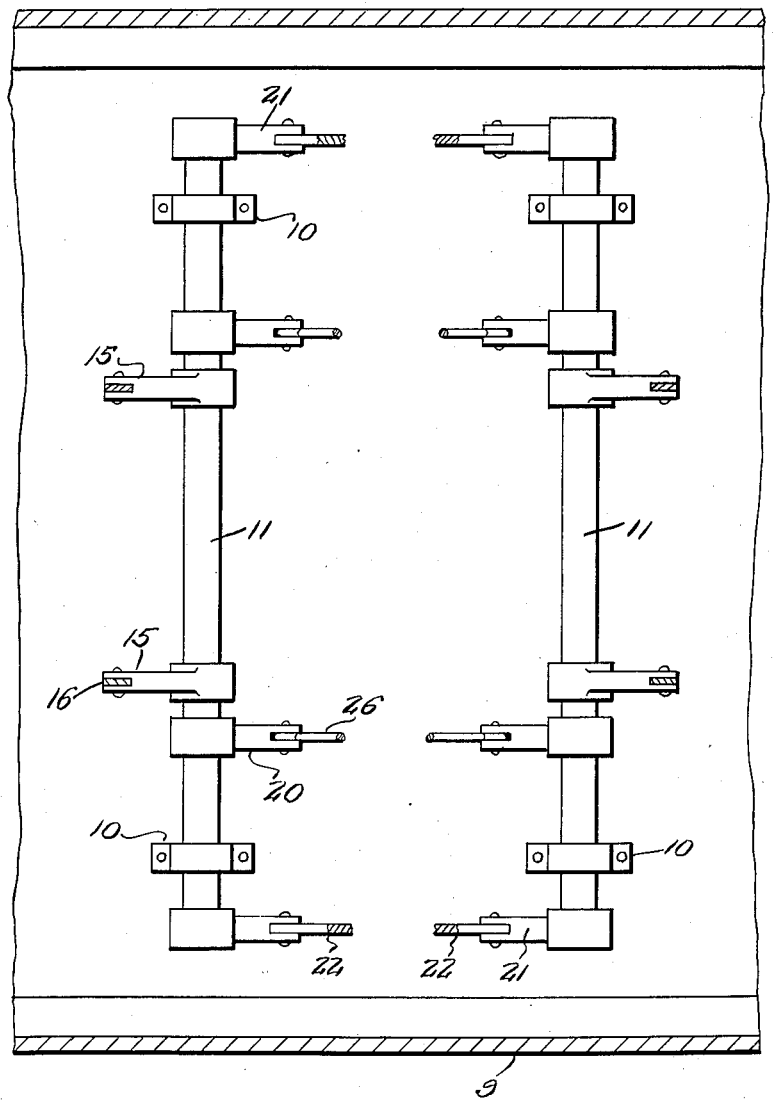
Figure 4 is a fragmentary horizontal section taken substantially on the line 4—4 of Figure 3.

Referring to the drawings in detail it will be seen that the numerals 5 denote a pair of runways which are formed by the top of a casing 9 sunk in the roadway. The runways have their inner ends spaced apart to provide a transverse space, and at each end of the space a hollow post 6 rises from the top of the casing, the posts being suitably connected with the casing. The runways 5 are each provided with a pair of spaced parallel coextensive slots equidistant from the longitudinal axis of the runways and in which are disposed elongated treadles 7 pivotally mounted as at 8 remote from said space so as to be free at the inner ends thereof. It is on these treadles that the automobile is adapted to be run for opening the gate.

Figure 5:
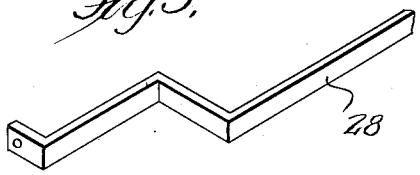
Figure 5 is a perspective view of one end of a fixed bar.

In the casing 9 and rising from the bottom thereof are two pairs of standards 10, in the upper ends of which are journalled a pair of spaced parallel shafts 11. On each shaft 11 and spaced inwardly from the standards 10 are a pair of cranks 15 inclining upwardly and outwardly as shown in Figure 2 and having pivotally engaged therewith links 16 which are pivotally engaged with the treadles 7 adjacent their inner ends. Pairs of cranks 20 and 21 are fixed to each shaft 11, the cranks 21 being connected to the ends of each shaft and the cranks 20 being connected to intermediate parts of the shaft and these cranks 20 and 21 decline inwardly and downwardly in substantial parallelism and in substantially opposite directions to the cranks 15. Cranks 21 have links 22 pivotally engaged therewith and these links 22 of the two shafts are pivotally engaged with loops 23 depending from weights 24 slidable in the hollow posts 6. Lazy tong structures 25 at their lower ends are engaged with links 26 pivotally engaged with the cranks 20 of the two shafts. These lazy tong structures 25 are pivotally engaged as at 27 with a fixed bar 28 anchored in the base casing 9 as at 30 and offset at each end as shown clearly in Figure 5 to extend across the base casing under the runways 5 immediately below the space therebetween. A plurality of gate rods 32 are connected with the lazy tong structures to move between the posts 6 up and down.

From the detailed description thus far, it will be readily apparent that as an automobile moves on to a pair of treadles 7 the weight of the automobile will swing the treadles downwardly to rock one of the shafts 11 whereby the cranks 21 of said shafts and the links 22 will push upwardly the weights 24 and the cranks 20 and the links 26 of said shaft will exert an upward push on the lower ends of the lazy tongs, so that said tongs will open and shorten and thus move the bars or rods 32 into the space between the treadles so that the automobile may pass. As it will be seen the links 22 of the cranks 21 of the two shafts are connected together by the loops 23 of the weights so that movement of one shaft by the depression of a pair of treadles will be communicated to the other shaft so that the treadles which are connected to said other shaft will be lowered at the same time that the other pair of treadles are being lowered by the weight of an automobile passing over the same. After the automobile has passed over the device the weights 24 will move downwardly and return the parts to normal position with the treadles in raised position as shown in Figure 2.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A vehicle actuating gate comprising a casing located in a roadway and having longitudinally extending slots in its top and a centrally arranged transverse slot in its top, posts of hollow construction rising from the top of the casing located at the ends of the transverse slot, treadles pivotally connected with the casing at their outer ends and having their inner ends terminating at the transverse slot, a pair of transverse shafts rotatably supported in the casing and spaced slightly outwardly from the vertical plane of the transverse slot, outwardly and upwardly extending cranks attached to each shaft, links connecting said cranks with the treadles whereby said shaft will be rocked when the treadles are depressed, a pair of downwardly and inwardly extending cranks carried by each shaft, a vertically movable weight in each post, a pair of links pivotally connected to the lower end of each weight, one link being pivotally connected to one of the last mentioned cranks of one shaft and the other link pivotally connected to the last mentioned crank of the other shaft, a pair of lazy tong structures, gate forming rods carried by said structures, links connected to the lower ends of said structures and inwardly and downwardly extending cranks carried by the shafts and to which the last mentioned links are connected.

2. In a vehicle operated gate, a pair of treadles pivotally supported at their outer ends and having their inner ends spaced apart, said treadles being in alinement, a post, a weight supported for vertical movement by the post, a pair of shafts, means for connecting the shafts to the inner portions of the treadles, means for connecting the weight to the shafts whereby downward movement of the weight will rock the shafts and raise the treadles and downward movement of a treadle will rock the shafts and raise the weight, a lazy tong structure, gate rods carried thereby and means connecting said structure to the shafts for lowering the structure and the gate rods when the shafts are rocked by lowering of the treadle, the lazy tong structure and the rods being raised when the shafts are rocked by downward movement of the weight.

ODESSA D. BOARDMAN.